United States Patent
Honeycutt et al.

[19]

[11] Patent Number: 6,110,293
[45] Date of Patent: Aug. 29, 2000

[54] OIL ABSORPTION AND RECLAMATION METHODS

[75] Inventors: Travis W. Honeycutt, Gainesville; Baosheng Lee; Nigel J. Flynn, both of Duluth; Feng Qin, Norcross, all of Ga.

[73] Assignee: Isolyser Company, Inc., Norcross, Ga.

[21] Appl. No.: 09/023,627

[22] Filed: Feb. 13, 1998

[51] Int. Cl.$^7$ .................................................. B08B 7/00
[52] U.S. Cl. ................................. 134/6; 134/40; 134/42
[58] Field of Search ................................ 134/6, 42, 40

[56] References Cited

U.S. PATENT DOCUMENTS

| | | | |
|---|---|---|---|
| Re. 35,073 | 10/1995 | Dickey et al. ............................. | 134/6 |
| 3,888,766 | 6/1975 | Young ..................................... | 210/680 |
| 4,832,852 | 5/1989 | Wells et al. ............................. | 210/671 |
| 5,181,966 | 1/1993 | Honeycutt et al. ..................... | 134/42 |
| 5,181,967 | 1/1993 | Honeycutt ............................... | 134/42 |
| 5,207,837 | 5/1993 | Honeycutt ............................... | 134/42 |
| 5,244,503 | 9/1993 | Fabian .................................... | 134/6 |
| 5,451,325 | 9/1995 | Herkenberg ............................ | 210/693 |

FOREIGN PATENT DOCUMENTS

2081569 A  2/1982  United Kingdom ........................ 134/6

*Primary Examiner*—Randy Gulakowski
*Assistant Examiner*—Saud Chaudhry
*Attorney, Agent, or Firm*—Needle & Rosenberg, P.C.

[57] ABSTRACT

A method of absorbing oil or wax by contacting the oil or wax with a nonwoven or woven fabric prepared from a polyvinyl alcohol fiber. A method of recovering oil or wax contained in such a fabric using water and at a rate surprisingly faster than the rate of oil or wax recovery from cotton. A method of absorbing oil or wax from a mixture of oil or wax and sand by contacting the mixture with a fabric made from polyvinyl alcohol. Method of disposing of such fabrics which have been soiled or saturated with the oil or wax. The method is also applicable to other hydrocarbons such as aliphatic or aromatic hydrocarbon solvents.

30 Claims, No Drawings

OIL ABSORPTION AND RECLAMATION METHODS

BACKGROUND OF THE INVENTION

1. Field of the Invention

The present invention relates to methods of using polyvinyl alcohol based fabrics. In particular, the present invention provides methods for oil, wax, or hydrocarbon solvent absorption or adsorption and release using textiles formed from polyvinyl alcohol based fibers.

2. Background of the Invention

The spillage of oil or oily substances such as waxes is a common occurrence. In the household setting, such spills are generally cleaned using a fibrous material such as a paper towel or a cotton towel. The recovery of oil or wax by cotton towels is adequate at best. Moreover, once used, it is difficult to remove the oils from the cotton fabric for reuse of the fabric.

In the industrial setting, special nonwoven fabrics have been developed to assist in the recovery of oils or waxes. These nonwovens perform better than cotton fibers at absorbing oil. An example of such a nonwoven is the 3M® SRP Petro Spill Response Pack (3M Company, Minneapolis, Minn.) product. However, this product is expensive and does not release the oil or wax sufficiently rapidly to be practical. Therefore, there exists a need for reclamation and recovery methods employing superior materials.

In addition, where large oil spills have contaminated sand, there exists a need for a more effective way to recovery oils or oily substances from the sand.

Moreover, once the typical fabrics become saturated with oil or wax, they must be disposed of, which is an added expense.

Therefore there exists a need for a novel method of recovering and releasing oil or oily substances such as waxes. In addition, there exists a need for novel methods of recovering oil or wax from oil/sand mixtures. Finally, there exists a need for efficiently disposing of used recovery materials after the oil or wax has been recovered.

SUMMARY OF THE INVENTION

The present invention solves all of these drawbacks and provides further surprising properties. These and further objects of the invention will be more readily appreciated when considering the following disclosure and appended claims.

The present invention presents a method of absorbing or adsorbing oil or wax comprising contacting the oil or wax with a nonwoven or woven fabric prepared from a hot water soluble, cold water insoluble polyvinyl alcohol fiber.

In another embodiment, the invention provides a method of recovering oil or wax contained in a woven fabric, comprising contacting the woven fabric with water wherein the woven fabric is formed from polyvinyl alcohol fiber formed from a hot water soluble, cold water insoluble polyvinyl alcohol fiber.

In a further embodiment, the present invention provides a method of disposing of a nonwoven or woven fabric prepared from a hot water soluble or dispersible, cold water insoluble or nondispersible polyvinyl alcohol fiber, comprising the steps of:

a) absorbing or adsorbing an oil or wax onto the fabric; and b) contacting the fabric with water of a sufficient temperature and for a sufficient period of time to dissolve or disperse the fabric.

A method of absorbing or adsorbing an aliphatic or aromatic hydrocarbon solvent comprising contacting the hydrocarbon solvent with a nonwoven or woven fabric prepared from a hot water soluble, cold water insoluble polyvinyl alcohol fiber.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention.

Before the present articles and methods are disclosed and described, it is to be understood that the terminology used herein is for the purpose of describing particular embodiments only and is not intended to be limiting. It must be noted that, as used in the specification and the appended claims, the singular forms "a", "an" and "the" include plural referents unless the context clearly dictates otherwise.

Throughout this application, where publication are references, the disclosures of these publication in their entireties are hereby incorporated by reference into this application in order to more fully describe the state of the art to which this invention pertains.

The present invention provides a method of absorbing or adsorbing oil or wax comprising contacting the oil or wax with a nonwoven or woven fabric prepared from a polyvinyl alcohol fiber formed from a polyvinyl alcohol ("PVA") homopolymer that has been highly crystallized by post drawing or by heat annealing.

The PVA fibers suitable for the present purposes are disclosed and described in U.S. Pat. Nos. B1 5,181,966 and B1 5,207,837, the contents of both of which are incorporated herein in their entirety by this reference.

In one embodiment, the nonwoven or woven fabric is formed from polyvinyl alcohol fiber by spin bonding. In an alternate embodiment, the nonwoven or woven fabric is formed from PVA by melt blowing. In still a further embodiment, the nonwoven or woven fabric is formed by wet layering and hydroentangling the polyvinyl alcohol fiber. In another embodiment, the nonwoven or woven fabric is formed by thermally bonding the fiber. In still a further embodiment, the fabric is formed by dry laying the fiber. In one embodiment, after dry laying, the fiber is carded to produce a more uniform distribution of fibers and then needle-punched to enhance the strength of the fabric. Finally, after carding and needle-punching, the fiber can, optionally, be thermobonded.

In another embodiment, the oil or wax is a mineral oil. In an alternate embodiment, the oil is a vegetable-derived oil such as, but not limited to, corn oil. In still a further embodiment, the oil is engine oil.

In a further embodiment, the present invention provides a method of disposing of a nonwoven or woven fabric prepared from a hot water soluble, cold water insoluble (or dispersible) polyvinyl alcohol fiber formed from a polyvinyl alcohol homopolymer that has been highly crystallized by post drawing or by heat annealing. By "hot water" it is intended to refer to water at above 37° C., more preferably above 50° C., even more preferably above 75° C., and still more preferably above 90° C. The disposal method includes the steps of first absorbing or adsorbing oil or wax onto the fabric. The oil or wax need not saturate the fabric. Next, the method involves contacting the fabric with water of a sufficient temperature and for a sufficient period of time to dissolve or disperse the fabric. Thus, using this disposal method, there is no solid waste fabric product to dispose of and the solution of oil or wax and dissolved fabric can be readily disposed of.

In another embodiment, the present invention provides a method of recovering oil or wax contained in a woven or nonwoven fabric, comprising contacting a woven or nonwoven fabric with water and agitating the water, where the woven fabric is formed from polyvinyl alcohol fiber formed from a polyvinyl alcohol homopolymer ("PVA") that has been highly crystallized by post drawing or by heat annealing. For instance, for a woven PVA fabric, a weight of 1 dn. is suitable; however, for nonwovens, this amount can be even less. In one embodiment, the water is at room temperature.

In another embodiment, the present invention provides a method of absorbing or adsorbing oil or wax from a mixture comprising an oil or wax and sand (such as oil-contaminated sea sand) or gravel comprising contacting the mixture with a woven or nonwoven fabric comprising polyvinyl alcohol formed from a polyvinyl alcohol homopolymer that has been highly crystallized by post drawing or by heat annealing.

In yet another embodiment, the invention provides a method of absorbing or adsorbing an aliphatic or aromatic hydrocarbon solvent comprising contacting the hydrocarbon solvent with a nonwoven or woven fabric prepared from a hot water soluble, cold water insoluble polyvinyl alcohol fiber.

The following examples are set forth so as to provide those of ordinary skill in the art with a complete disclosure and description of how the compositions and articles claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. and is at room temperature, and pressure is at or near atmospheric.

The examples demonstrate the following surprising improvements of the invention:

1. Both PVA woven and nonwovens can absorb oil. While the woven is similar in performance to cotton, the nonwoven is surprisingly absorbent;
2. In water, the PVA woven towel released absorbed oil at a much faster rate than cotton;
3. At room temperature, the PVA woven towel releases a larger amount of oil than cotton; and
4. PVA woven and nonwoven fabrics can absorb oil from oil/sand mixtures and the absorbency of the fabrics are dependent on the oil concentration in the sand.

For oil or wax recovery testing, the following protocol was used.

1. 5 ml. of oil was added to 4 g. of towel sample (8 fold);
2. The Towel was soaked in water, under moderate agitation;
3. After 30 minutes, the volume of oil floating on the top of the water was measured and the percentage of recovered oil was calculated.

The cotton towel used was a blue cotton towel (26"×16" 67 g. Blue Non-Sterilized MedSurg™ Towel, MedSurg, Norcross, Ga.). The PVA fabrics tested were OREX® Towel—Teal (Isolyser Company Inc., Norcross, Ga.) nonwoven fabric 52 g., 25"×15" untreated white and OREX® woven towel, teal colored, untreated.

For absorption testing, the following protocol was followed (using the same towels, as well as using a 3M® spunbond nonwoven fabric used in 3M® Petroleum Sorbent kits.

1. Soak pre-weighed fabric samples into oil (10W30 engine oil, Castrol) for 20 minutes;
2. Remove fabric samples from oil and put them in a funnel for 1 hour; and
3. Measure the weight of the oil absorbed in the fabric and calculate the weight ratio of oil to fabric.

The protocol for determine oil release rate (using 10W30 engine oil again) was as follows:

1. Oil saturated fabrics are placed into a weighed cylinder; and
2. Water is added into the cylinder and the amount of oil is measured at various time intervals.

The following protocol was used for testing oil absorption from an oil/sand mixture:

1. Oil (engine oil 10W30) was mixed with sand for 20 minutes;
2. Pre-weighed fabric samples were added to the oil/sand mixture for 20 minutes; and
3. After the 20 minutes, the fabric samples were removed and weighed to determine the weight of oil absorbed in the fabric.

EXAMPLE I

This example compares oil recovery percentage of polyvinyl alcohol based fabric versus cotton fabric at room temperatures.

| Type of Oil | Cotton Towel | PVA Towel |
| --- | --- | --- |
| Mineral Oil | 58% | 77% |
| Corn Oil | 62% | 82% |
| Engine Oil | 80% | 92% |

EXAMPLE II

This example compares oil recovery percentage of polyvinyl alcohol based fabric versus cotton fabric at elevated temperature (50° C).

| Type of Oil | Cotton Towel | PVA Towel |
| --- | --- | --- |
| Mineral Oil | 90% | 92% |
| Corn Oil | 86% | 84% |
| Engine Oil | 86% | 92% |

EXAMPLE III

This example shows the maximum oil absorption properties of OREX® fabric compared to cotton towels. The sitting time was approximately 40 minutes. The OREX® nonwoven performs better than cotton and almost as good as the specialized 3M product.

| Sample | Weight (g.) | Oil Absorbed (g.) | Weight ratio (oil:fabric) |
| --- | --- | --- | --- |
| Orex nonwoven | 0.111 | 0.745 | 6.71 |
| Orex towel | 0.331 | 0.908 | 2.74 |
| Cotton towel | 0.333 | 1.012 | 3.04 |
| 3M nonwoven | 0.625 | 6.06 | 9.70 |

EXAMPLE IV

This test is similar to Example III, except that the sitting time was one hour.

| Sample | Weight (g.) | Oil Absorbed (g.) | Weight ratio (oil:fabric) |
| --- | --- | --- | --- |
| Orex nonwoven | 0.128 | 0.668 | 5.22 |
| Orex towel | 0.310 | 0.854 | 2.75 |
| Cotton towel | 0.322 | 0.836 | 2.60 |

EXAMPLE V

This example demonstrates the release rate (milliliter) from various fabrics of absorbed oil.

| Sample | Weight (g.) | Oil Absorbed (g.) | 1.5 min. | 4.0 min. | 10 min. | 16 min. |
| --- | --- | --- | --- | --- | --- | --- |
| Orex nonwoven | 0.111 | 0.745 | 0 | 0.06 | 0.2 | 0.3 |
| Orex towel | 0.331 | 0.908 | 0.3 | 0.6 | 0.7 | 0.8 |
| Cotton towel | 0.333 | 1.012 | 0 | 0.1 | 0.3 | 0.4 |

EXAMPLE VI

This example shows the maximum oil absorption properties of OREX® fabric compared to cotton towels for absorbing or adsorbing oil from and oil/sand mixture. For this test, 30 g. of oil was mixed with 600 g. of sand.

| Sample | Weight (g.) | Oil Absorbed (g.) | Weight ratio (oil:fabric) |
| --- | --- | --- | --- |
| Orex nonwoven | 0.238 | 0.82 | 3.45 |
| Orex towel | 1.000 | 0.77 | 0.77 |
| Cotton towel | 0.953 | 0.94 | 0.99 |

EXAMPLE VII

This test was the same as that of Example VI, except that after mixing the oil and sand, the mixture was left overnight before the fabric samples were added.

| Sample | Weight (g.) | Oil Absorbed (g.) | Weight ratio (oil:fabric) |
| --- | --- | --- | --- |
| Orex nonwoven | 0.241 | 0.39 | 1.62 |
| Orex towel | 0.785 | 0.34 | 0.43 |
| Cotton towel | 0.807 | 0.40 | 0.50 |

EXAMPLE VIII

For this test, 30 g. of oil was mixed with 300 g. of sand.

| Sample | Weight (g.) | Oil Absorbed (g.) | Weight ratio (oil:fabric) |
| --- | --- | --- | --- |
| Orex nonwoven | 0.293 | 1.347 | 4.60 |
| Orex towel | 0.384 | 0.771 | 2.01 |
| Cotton towel | 0.386 | 0.806 | 2.09 |

It will be apparent to those skilled in the art that various modification and variations can be made in the present invention without departing form the scope or spirit of the invention. Other embodiments of the invention will be apparent to those skilled in the art from consideration of the specification and practice of the invention disclosed therein. It is intended that the specification and examples be considered as exemplary only, with the true scope and spirit of the invention being indicated by the following claims.

What is claimed is:

1. A method of absorbing or adsorbing oil or wax comprising contacting the oil or wax with a nonwoven or woven fabric wherein said nonwoven or woven fabric comprising a hot water soluble, cold water insoluble polyvinyl alcohol fiber.

2. The method of claim 1, wherein the polyvinyl alcohol fiber is comprised of a polyvinyl alcohol homopolymer has been highly crystallized by post drawing or by heat annealing.

3. The method of claim 1, wherein the nonwoven or woven fabric is formed from the polyvinyl alcohol fiber by spin bonding.

4. The method of claim 1, wherein the nonwoven or woven fabric is formed from the polyvinyl alcohol fiber by melt blowing.

5. The method of claim 1, wherein the nonwoven or woven fabric is formed by wet layering and hydroentangling the polyvinyl alcohol fiber.

6. The method of claim 1, wherein the nonwoven or woven fabric is formed by thermally bonding the fiber.

7. The method of claim 1, wherein the nonwoven or woven fabric is formed by dry laying the fiber.

8. The method of claim 1, wherein the oil or wax is mineral oil.

9. The method of claim 1, wherein the oil or wax is a vegetable-derived oil.

10. The method of claim 1, wherein the oil or wax is engine oil.

11. A method of recovering oil or wax contained in a woven fabric, comprising:
   a) contacting the woven fabric with hot water and thereby dissolving the fabric to form an aqueous solution and an oil or wax phase; and
   b) separating the oil or wax phase from the aqueous solution;

wherein the woven fabric comprises a hot water soluble, cold water insoluble polyvinyl alcohol fiber.

12. The method of claim 11, further comprising agitating fabric in the water.

13. The method of claim 11, wherein the polyvinyl alcohol fiber is comprised of a polyvinyl alcohol homopolymer has been highly crystallized by post drawing or by heat annealing.

14. The method of claim 11, wherein the water is at room temperature.

15. The method of claim 11, wherein the oil or wax is mineral oil.

16. The method of claim 11, wherein the oil or wax is vegetable-derived oil.

17. The method of claim 11, wherein the oil or wax is engine oil.

18. A method of absorbing or adsorbing oil or wax from a mixture comprising an oil or wax and sand comprising contacting the mixture with a woven or nonwoven fabric wherein said nonwoven or woven fabric comprising a hot water soluble, cold water insoluble polyvinyl alcohol fiber.

19. The method of claim 18, wherein the polyvinyl alcohol fiber is comprised of a polyvinyl alcohol homopolymer has been highly crystallized by post drawing or by heat annealing.

20. The method of claim 18, wherein the nonwoven or woven fabric is formed from the polyvinyl alcohol fiber by spin bonding.

21. The method of claim 18, wherein the nonwoven or woven fabric is formed from the polyvinyl alcohol fiber by melt blowing.

22. The method of claim 18, wherein the nonwoven or woven fabric is formed by wet layering and hydroentangling the polyvinyl alcohol fiber.

23. The method of claim 18, wherein the nonwoven or woven fabric is formed by thermally bonding the fiber.

24. The method of claim 18, wherein the nonwoven or woven fabric is formed by dry laying the fiber.

25. The method of claim 18, wherein the oil or wax is vegetable-derived oil.

26. The method of claim 18, wherein the oil or wax is engine oil.

27. The method of claim 18, wherein the oil or wax is mineral oil.

28. A method of disposing of a nonwoven or woven fabric wherein said nonwoven or woven fabric comprising a hot water soluble or dispersable, cold water insoluble or non dispersable polyvinyl alcohol fiber, comprising the steps of:

a) absorbing or adsorbing an oil or wax onto the fabric; and b) contacting the fabric with water of a sufficient temperature and for a sufficient period of time to dissolve or disperse the fabric.

29. The method of claim 28, wherein the polyvinyl alcohol fiber is comprised of a polyvinyl alcohol homopolymer has been highly crystallized by post drawing or by heat annealing.

30. A method of absorbing or adsorbing an aliphatic or aromatic hydrocarbon solvent comprising contacting the aliphatic or aromatic hydrocarbon solvent with a nonwoven or woven fabric wherein said nonwoven or woven fabric comprising a hot water soluble, cold water insoluble polyvinyl alcohol fiber.

* * * * *